US012166868B2

(12) United States Patent
Park et al.

(10) Patent No.: US 12,166,868 B2
(45) Date of Patent: Dec. 10, 2024

(54) SEMICONDUCTOR DEVICE IMPLEMENTING PHYSICALLY UNCLONABLE FUNCTION

(71) Applicant: POSTECH Research and Business Development Foundation, Pohang-si (KR)

(72) Inventors: Jae Han Park, Busan (KR); Jae Yoon Sim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 338 days.

(21) Appl. No.: 17/736,986

(22) Filed: May 4, 2022

(65) Prior Publication Data

US 2023/0044357 A1   Feb. 9, 2023

(30) Foreign Application Priority Data

Aug. 9, 2021   (KR) .......................... 10-2021-0104494

(51) Int. Cl.
*H04L 9/08*   (2006.01)
*H03K 19/003*   (2006.01)

(52) U.S. Cl.
CPC .......... *H04L 9/0861* (2013.01); *H03K 19/003* (2013.01)

(58) Field of Classification Search
CPC ................ H04L 9/0861; H04L 9/0866; H03K 19/003; G09C 1/00; G11C 16/22; G06F 21/71
USPC .......................................... 340/5.8, 2.1, 2.29
See application file for complete search history.

(56) References Cited

U.S. PATENT DOCUMENTS

| | | | |
|---|---|---|---|
| 9,083,323 B2 * | 7/2015 | Guo | H04L 9/3278 |
| 10,164,640 B1 * | 12/2018 | Lu | G11C 16/045 |
| 10,243,749 B2 * | 3/2019 | Park | G09C 1/00 |
| 10,574,469 B1 * | 2/2020 | Garni | G11C 11/419 |
| 10,812,084 B2 * | 10/2020 | Strukov | G11C 16/22 |
| 10,880,102 B2 * | 12/2020 | Lu | H04L 9/3278 |
| 10,958,453 B2 * | 3/2021 | Lu | G11C 7/24 |
| 11,528,151 B2 * | 12/2022 | Lu | H03K 19/0963 |
| 11,695,577 B2 * | 7/2023 | Lee | G06F 21/75 |
| | | | 713/194 |
| 11,734,459 B2 * | 8/2023 | Spalding | H04L 9/3278 |
| | | | 713/189 |
| 2014/0225639 A1 | 8/2014 | Guo et al. | |
| 2017/0180140 A1 * | 6/2017 | Mai | H04L 9/3278 |
| 2019/0058602 A1 * | 2/2019 | Wang | G06F 21/72 |
| 2019/0068190 A1 | 2/2019 | Karpinskyy et al. | |
| 2019/0305971 A1 * | 10/2019 | Li | G11C 7/02 |

(Continued)

*Primary Examiner* — Nam V Nguyen
(74) *Attorney, Agent, or Firm* — Morgan, Lewis & Bockius LLP

(57) ABSTRACT

An exemplary embodiment of the present disclosure provides a physically unclonable function (PUF) cell capable of exhibiting a stable performance and showing an excellent repeatability while being less affected by environmental factors such as a noise, temperature, and bias voltage. The PUF cell generates an output value by combining a scheme of amplifying a threshold voltage difference and a scheme of amplifying an oscillation frequency difference. In an oscillator that generates oscillation signals of different frequencies, the frequency difference of the oscillation signals is amplified by alternately supplying bias voltages of different magnitudes generated by utilizing the threshold voltage difference to a plurality of stages in the oscillator.

16 Claims, 12 Drawing Sheets

FIG. 2

(56) References Cited

U.S. PATENT DOCUMENTS

2019/0384915 A1 12/2019 Hars
2020/0136840 A1 4/2020 Lee et al.

\* cited by examiner

FIG. 14

| | ISSCC'17 K. Yang | ISSCC'18 J. Lee | JSSC'18 S. Taneja | JSSCC'19 D. Li | JSSC'20 Z. Liang | JSSCC'20 Y. Choi | PRESENT DISCLOSURE |
|---|---|---|---|---|---|---|---|
| Technology | 180nm | 180nm | 40nm | 65nm | 28nm | 28nm | 40nm |
| PUF type | 2T AMP | Leakage | Current Mirror | 3T AMP | RO | NAND | Hybrid RO |
| Native BER [%] | 3.13 | 0.72 | 3.2 | 0.035 [1,2] | 0.156 | 10.5 | 0.027 |
| Core cell Stabilization | TMV, EVB, Masking | TMV, Masking | Hysteresis, T compensation | TMV, EVB, Reconfigure | TMV | Masking, Validity checker | TMV, Masking |
| Masking ratio [%] | 8.9 [1] | 10 | - | - | - | 25 | 3.64 |
| BER after stabilization [%] | 0.05 | 0.004 | 0.81 | 0.00182 | 0.078 | 0.089 | 0 |
| Voltage Range [V] | 0.8-1.8 | 1.2-1.8 | 0.8-1.0 | 0.7-1.4 | 0.4-1.3 | 0.81-0.99 | 0.7-1.4 |
| Temperature Range [°C] | -40~120 | 0~80 | -40~125 | -55~125 | -40~125 | -40~150 | -40~125 |
| Worst case BER [%] | 2 | - | 4.6 [1] | 2.3 [1] | 0.55 | 0.97 | 0.0019 |
| BER variation per 10°C [%] | 0.2 | - | 0.15 | 0.12 | 0.0052 | - | 0.0000107 |
| BER variation per 0.1V [%] | 0.2 | - | 0.36 | 0.057 | 0.0546 | - | 0.00027 |
| Core Energy [pJ/b] | 0.011 | 9.8 | 0.001 | 0.000076 | 2.15 | 2.968 | 0.039 |

[1] Estimated from figures
[2] After reconfiguration

SEMICONDUCTOR DEVICE IMPLEMENTING PHYSICALLY UNCLONABLE FUNCTION

CROSS-REFERENCE TO RELATED APPLICATION

The present application claims a convention priority to Korean Patent Application No. 10-20210-0104494 filed on Aug. 9, 2021, with the Korean Intellectual Property Office (KIPO), the entire content of which is incorporated herein by reference.

BACKGROUND

1. Technical Field

The present disclosure relates to a security device and, more particularly, a semiconductor device generating a security key value by a physically unclonable function utilizing a difference in physical properties between individual semiconductor devices that occur due to local non-uniformity of process conditions in a semiconductor manufacturing process.

2. Related Art

All semiconductor devices have unique physical properties. Even semiconductor devices manufactured using a same layout design on a same wafer through same processes may reveal unpredicted differences in physical properties due to a local non-uniformity of the process conditions. A physically unclonable function (PUF) circuit, which converts the difference in the physical properties arising from the process inconsistency into a digital value, is used to generate a unique value for each device, like a fingerprint, according to the difference in the physical properties between the semiconductor devices. Since the PUF circuit cannot be cloned or physically copied, the data generated by the PUF circuit may be used as a security key for an encryption algorithm for secure communication between Internet of thing (IoT) devices, for example.

Existing PUF devices may be generally categorized into devices utilizing a threshold voltage difference between transistor amplifiers or switches and devices utilizing a frequency difference between oscillators.

The device utilizing the threshold voltage difference includes a plurality of stages of voltage amplifiers connected in series to generate a security key according to the threshold voltage difference. The threshold voltage difference at early stages is amplified by voltage gains of the voltage amplifiers in middle and end stages and is converted into a digital key value at the end. However, this type of PUF device is weak against noise. If the threshold voltage difference between a first and second amplifiers having dominant influences on a key generation is too small, the output becomes unstable due to an effect of the noise. Even worse, the threshold voltage of the voltage amplifier may change according to a change in a temperature or a bias voltage, and the threshold voltages of the early stage amplifiers may be reversed due to environmental factors, which may result in a generation of a wrong key. Therefore, an error correction coding circuit for preventing, detecting, or correcting errors needs to be provided additionally to facilitate a stable operation of the voltage amplifier structure in the key generation process, which may greatly increase a power consumption of the integrated circuit.

In the PUF device of the second type utilizing the frequency difference between oscillators, inverters constituting the oscillators may reveal different delays due to the local non-uniformity of the process conditions, and thus the oscillators may have slightly different frequencies. A key value generated by the PUF device may vary depending on which of the two oscillators shows a faster signal phase. In case of a structure using a ring oscillator, several cycles of oscillation occur before the output is determined. A noise generated in a stage of the oscillator may be cancelled by an averaging over stages and over several cycles, which may greatly reduce the errors caused by the noise. However, the oscillator structure requires a relatively long time to finally generate the output. Further, the oscillator structure may consume large power because the oscillation is repeated before a stable output is generated.

Meanwhile, in the PUF hardware utilizing the slight non-uniformity of process conditions caused in the fabrication process, the degree of mismatch is not the same for all PUF cells, and there may be a PUF cell in which the mismatch happens to be too small. Such a cell is error-prone depending on the noise level and the environmental factors and needs to be identified in advance and excluded from the key generation, which is referred to as a masking. Conventional PUF devices may require masking of a large number of cells to ensure the stable key generation. A preparation of a much larger number of PUF cells than a number of key bits needed for implementing the algorithm consumes a significant chip area or requires an additional area.

SUMMARY

Provided is a physically unclonable function (PUF) cell capable of exhibiting a stable performance and showing an excellent repeatability while being less affected by environmental factors such as a noise, temperature, and bias voltage.

Provided is a semiconductor device having a PUF cell array including a plurality of such PUF cells.

The PUF cell according to the present disclosure generates an output value by combining a scheme of amplifying a threshold voltage difference and a scheme of amplifying an oscillation frequency difference. In an oscillator that generates oscillation signals of different frequencies, the frequency difference of the oscillation signals is amplified by alternately supplying bias voltages of different magnitudes generated by utilizing the threshold voltage difference to a plurality of stages in the oscillator.

According to an aspect of an exemplary embodiment, a semiconductor device includes a PUF circuit having a plurality of PUF cells, each configured to generate a unique output value. Each of the plurality of PUF cells includes: a bias voltage generator configured to generate a first and second supply voltages of different levels; and an oscillator comprising a plurality of inverters connected in series and alternately biased at the first and second supply voltages.

The semiconductor device may further include a cell configuration signal supplier configured to supply a cell configuration signal to the plurality of PUF cells. The bias voltage generator generates the first and second supply voltages according to on the cell configuration signal.

The bias voltage generator may generate the first and second voltages of different levels due to a difference in threshold voltages of transistors in the bias voltage generator, and output one of the first and second voltages as the first supply voltage and outputs the other one of the first and second voltages as the second supply voltage based on the cell configuration signal.

The oscillator may include two oscillation paths, each passing through a predetermined number of inverters connected in series to form a loop and alternately biased at the first and second supply voltages.

Each of the oscillation paths may include: an enable gate configured to activate an oscillating operation of the oscillation path in response to a predetermined start signal; and the predetermined number of inverters connected in series from an output terminal of the enable gate.

The enable gate may have a first input terminal receiving the start signal and a second input terminal receiving an output of the other oscillation path.

The start signals input to the enable gates of the two oscillation paths may be identical to each other.

The semiconductor device may further include a cell configuration information determining unit configured to generate information on the cell configuration signal for each of the plurality of PUF cells.

The semiconductor device may further include: a first counter configured to count a number of oscillation cycles in a first oscillation path of the two oscillation paths in one of the PUF cells for a predetermined time; a second counter configured to count a number of oscillation cycles in a second oscillation path of the two oscillation paths in the PUF cell for the predetermined time; and a determiner configured to determine the information on the cell configuration signal for the PUF cell based on count values of the first counter and the second counter.

The first counter and the second counter may count respective number of oscillation cycles until an oscillating operation of the first oscillation path or the second oscillation path collapses.

The first supply voltage may include a first positive supply voltage and a first negative supply voltage, and the second supply voltage may include a second positive supply voltage and a second negative supply voltage. The first and second positive supply voltages may have levels different from each other, and the first and second negative supply voltages may have levels different from each other. The first and second positive supply voltages may alternately bias the plurality of inverters and the first and second negative supply voltages may alternately bias the plurality of inverters, such that inverters biased at the first positive supply voltage are biased at the second negative supply voltage and another inverters biased at the second positive supply voltage are biased at the first negative supply voltage.

The bias voltage generator may include: a first switching circuit configured to output one of first and second positive voltages having different levels as the first positive supply voltage and output the other one of the first and second positive voltages as the second positive supply voltage in response to the cell configuration signal; and a second switching circuit configured to output one of first and second negative voltages having different levels as the first negative supply voltage and output the other one of the first and second negative voltages as the second negative supply voltage in response to the cell configuration signal.

Each of the plurality of PUF cells may output an output signal of one of the two oscillation paths as the output value after an output signal of the other one of the two oscillation paths collapses.

According to another aspect of an exemplary embodiment, a semiconductor device includes: a physically unclonable function (PUF) cell array comprising multiple PUF cells; and a cell selection signal supplier configured to supply a cell selection signal for enabling to select at least one of the multiple PUF cells required to generate an output value. Each of the multiple PUF cells includes: an oscillator comprising two oscillation circuits each having a plurality of stages and configured to generate oscillation signals of different frequencies; and a bias voltage generator configured to generate a plurality of bias voltages supplied to the plurality of stages alternately to increase a frequency difference between the oscillation signals.

The semiconductor device may further include a cell configuration signal supplier configured to supply a cell configuration signal to the multiple PUF cells. The bias voltage generator may generate the plurality of bias voltages according to on the cell configuration signal.

According to yet another aspect of an exemplary embodiment, a security key generation device includes: a PUF cell array comprising multiple PUF cells; a cell configuration signal supplier configured to supply a cell configuration signal to the multiple PUF cells; a cell selection signal supplier configured to supply a cell selection signal for enabling to select a plurality of PUF cells required to generate respective output values among the multiple PUF cells. Each of the multiple PUF cells includes: an oscillator comprising two oscillation circuits each having a plurality of stages to generate oscillation signals of different frequencies due to a difference in physical properties of individual devices and output one-bit output value after an oscillations are collapsed; and a bias voltage generator configured to generate a plurality of bias voltages supplied to the plurality of stages alternately to increase a frequency difference between the oscillation signals. The security key generation device outputs a combination of the output values from the plurality of PUF cells as a security key.

According to an exemplary embodiment of the present disclosure, the scheme of amplifying the threshold voltage difference is combined with the scheme of amplifying the oscillation frequency difference to maximize a difference in a microstructure of a semiconductor material and a difference in physical properties between individual semiconductor devices.

The PUF device of the present disclosure is robust to environmental factors such as the noise, temperature, and voltage. Thus, the PUF device may exhibit the stable performance and show the excellent repeatability while being less affected by the environmental factors. The present disclosure enables to reduce the power consumption and decrease a proportion of the masking cells. In addition, the present disclosure may enables to reduce a dynamic power consumption during the oscillation operation because the number of cycles required for the PUF cell to output the stable value.

The PUF device of the present disclosure may facilitate to generate the security key according to an appropriate encryption algorithm or a key required to identify and authenticate the device in a wide temperature and voltage range with a small error rate, and thus may enhance a reliability and security of the device authentication.

BRIEF DESCRIPTION OF THE DRAWINGS

In order that the disclosure may be well understood, there will now be described various forms thereof, given by way of example, reference being made to the accompanying drawings, in which:

FIG. 14 is a table summarizing performances of the PUF device according to the present disclosure compared with those of existing devices.

Figure 1:
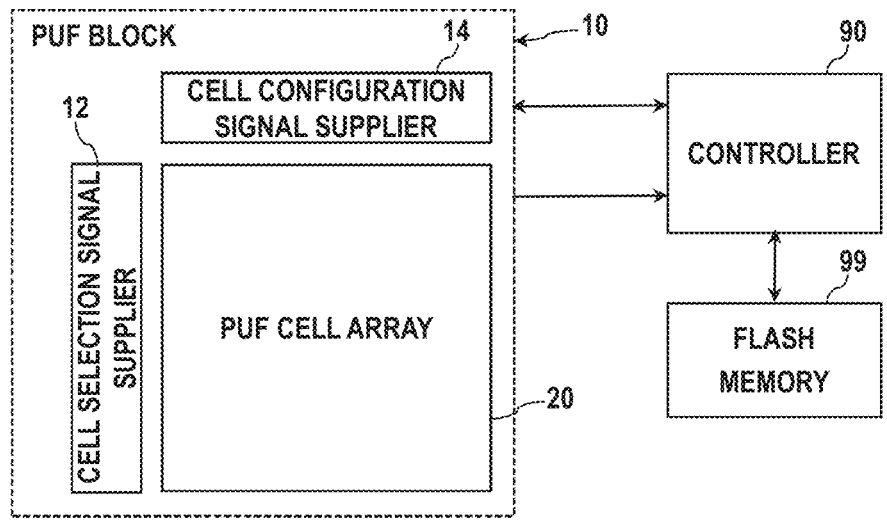
FIG. 1 is a block diagram of an integrated circuit according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In exemplary embodiments of the present disclosure, "at least one of A and B" may mean 'at least one of A or B' or 'at least one of combinations of one or more of A and B'. Also, in exemplary embodiments of the present disclosure, "one or more of A and B" may mean 'one or more of A or B' or 'one or more of combinations of one or more of A and B'.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanied drawings. In the following description and the drawings, similar or corresponding components may be designated by the same or similar reference numerals to facilitate an overall understanding of the present disclosure and replicate description of them will be omitted for simplicity.

FIG. 1 is a block diagram of an integrated circuit according to an exemplary embodiment of the present disclosure. The integrated circuit shown in the drawing may include a PUF block 10, a controller 90, and a flash memory 99. The PUF block 10 includes a plurality of cells and may output a key generated by all or at least some of the plurality of cells under the control of the controller 90. The controller 90 may supply a control signal to the PUF block 10. The control signal may include a key generation start signal for each cell in the PUF block 10 and cell configuration information stored in the flash memory 99. The flash memory 99 may store the cell configuration information for each cell in the PUF block 10.

In an exemplary embodiment, the PUF block 10, the controller 90, and the flash memory 99 may be packaged into a single integrated circuit chip. However, the present disclosure is not limited thereto, and the PUF block 10, the controller 90, and the flash memory 99 may be packaged as two or more integrated circuit chips.

The PUF block 10 may include a cell selection signal supplier 12, a cell configuration signal supplier 14, and a PUF cell array 20. The PUF cell array 20 includes a plurality of PUF cells each of which is capable of generating a 1-bit key value, and may generate the key having a plurality of bits. The cell selection signal supplier 12 may supply a cell selection signal to one of the PUF cells in the PUF cell array 20, so that the PUF cell may generate and output the key value in response to the cell selection signal. The cell configuration signal supplier 14 may supply a cell configuration signal to each PUF cell in the PUF cell array 20 to facilitate the generation of the key value by each of the PUF cells according to the cell configuration signal while being less affected by environment conditions such as a noise or a temperature.

Figure 2:
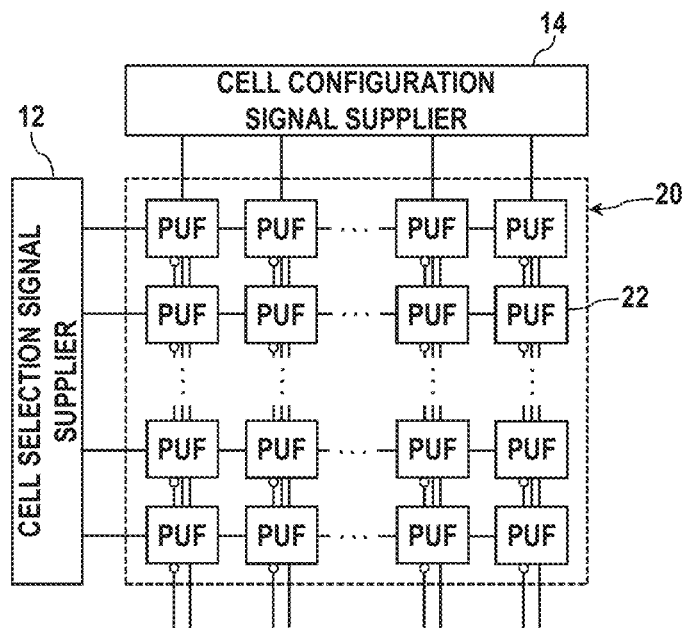
FIG. 2 is a block diagram of a PUF cell array shown in FIG. 1.

FIG. 2 is a block diagram of the PUF cell array 20 shown in FIG. 1. In order to facilitate the understanding of the present disclosure, the cell selection signal supplier 12 and the cell configuration signal supplier 14 shown in FIG. 1 are illustrated together with the PUF cell array 20 in FIG. 2. The PUF cell array 20 includes the PUF cells 22 arranged two-dimensionally in the horizontal and vertical directions in the drawing.

In an exemplary embodiment, the PUF cell array 20 may include 128 PUF cells 22 arranged in 4 rows and 8 columns. Each PUF cell 22 may have an internal configuration that changes according to the cell configuration signal received from the cell configuration signal supplier 14. Specifically, a supply voltage that biases gates in the PUF cell 22 may be selected as one of a plurality of supply voltage levels in response to the cell selection signal, which will be described below in detail. Each PUF cell 22 is activated according to the cell selection signal from the cell selection signal supplier 12 to output the 1-bit key value through a data bus. As a result, the PUF cell array 20 may generate the key of up to 128 bits and sequentially output the key bits.

Figure 3:
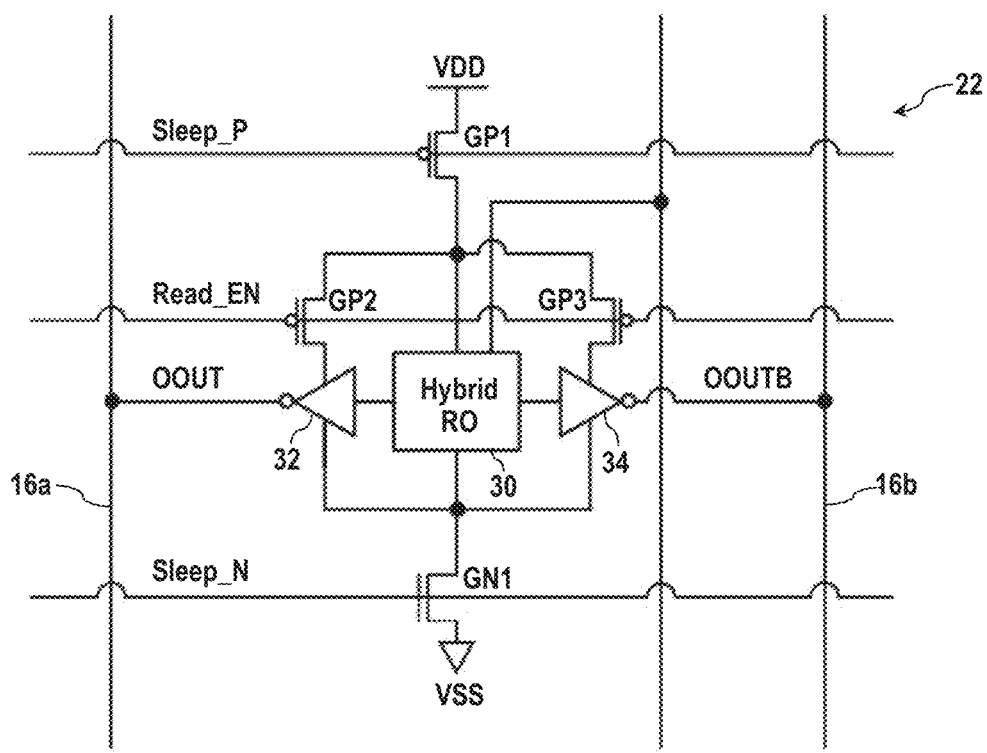
FIG. 3 is a detailed block diagram of a PUF cell according to an exemplary embodiment of the present disclosure.

FIG. 3 is a detailed block diagram of the PUF cell 22 according to an exemplary embodiment of the present disclosure. The PUF cell 22 may include a hybrid ring oscillator (RO) 30, output buffers 32 and 34, first and second gating transistors GP1 and GN1, and third and fourth gating transistors GP2 and GP3.

The hybrid ring oscillator 30 includes a plurality of transistors and generates the key value based on a difference in physical properties between the devices. The hybrid ring oscillator 30 is powered through the first and second gating transistors GP1 and GN1, which may selectively feed power to the hybrid ring oscillator 30. The output buffers 32 and 34 amplify signals generated by the hybrid ring oscillator 30 to output an amplified signal to a data bus 16 as output signals OUT and OUTB. Additionally, the output buffers 32 and 34 may isolate the output terminals of the hybrid ring oscillator 30 from an external circuit. The output buffers 32 and 34 may be implemented by using inverters. While not shown in the drawing, a start signal START for controlling an initiation of an oscillation may be input additionally to the hybrid ring oscillator 30.

The first gating transistor GP1 may be implemented by use of a PMOS transistor and has a source biased to a positive supply voltage VDD, a drain connected to the hybrid ring oscillator 30, and a gate receiving a first sleep signal Sleep_P. Accordingly, the first gating transistor GP1 may allow the positive supply voltage VDD to be supplied to the hybrid ring oscillator 30 only when the first sleep signal Sleep_P is at a low level while cutting off the supply of the positive supply voltage VDD to the hybrid ring oscillator 30 when the first sleep signal Sleep_P is at a high level.

The second gating transistor GN1 may be implemented by use of an NMOS transistor and has a drain connected to the hybrid ring oscillator 30, a source biased to a negative supply voltage VSS, and a gate receiving a second sleep signal Sleep_N. Accordingly, the second gating transistor GN1 may allow the negative supply voltage VSS to be supplied to the hybrid ring oscillator 30 only when the second sleep signal Sleep_N is at a high level while cutting off the supply of the negative supply voltage VSS to the hybrid ring oscillator 30 when the second sleep signal Sleep_N is at a low level.

The first and second gating transistors GP1 and GN1 block currents supplied to the hybrid ring oscillator 30 during a standby time when key value generation of the PUF cell 22 is unnecessary, thereby reducing a power consumption due to a standby power or leakage current. The first and second sleep signals Sleep_P and Sleep_N may be provided by the controller 90.

The first output buffer 32 may output an output signal OUT by buffering a signal output by the hybrid ring oscillator 30. The third gating transistor GP2 may be implemented by use of a PMOS transistor and has a source connected to the drain of the first gating transistor GP1, a drain connected to the first output buffer 32, and a gate receiving the cell selection signal (Read_EN). Accordingly, the third gating transistor GP2 may allow the positive supply voltage VDD to be supplied to the first output buffer 32 to enable the first output buffer 32 only when the cell selection signal Read_EN is activated to a low level while the first sleep signal Sleep_P is at a low level and the hybrid ring oscillator 30 is operating.

The second output buffer 34 may output an inverted output signal OUTB by buffering a signal output by the hybrid ring oscillator 30. The fourth gating transistor GP3 may be implemented by use of a PMOS transistor and has a source connected to the drain of the first gating transistor GP1, a drain is connected to the second output buffer 34, and a gate receiving the cell selection signal (Read_EN). Accordingly, the fourth gating transistor GP3 may allow the positive supply voltage VDD to be supplied to the second output buffer 34 to enable the second output buffer 34 only when the cell selection signal Read_EN is activated to the low level while the first sleep signal Sleep_P is at a low level and the hybrid ring oscillator 30 is operating.

Therefore, the third and fourth gating transistors GP2 and GP3 may allow the output buffers 23 and 34 to transfer the output signals OUT and OUTB to the data buses 16A and 16B, respectively, only when the cell selection signal Read_EN is activated. The cell selection signal Read_EN may be activated when the outputs of the hybrid ring oscillator 30 are stabilized sufficiently.

Figure 4:
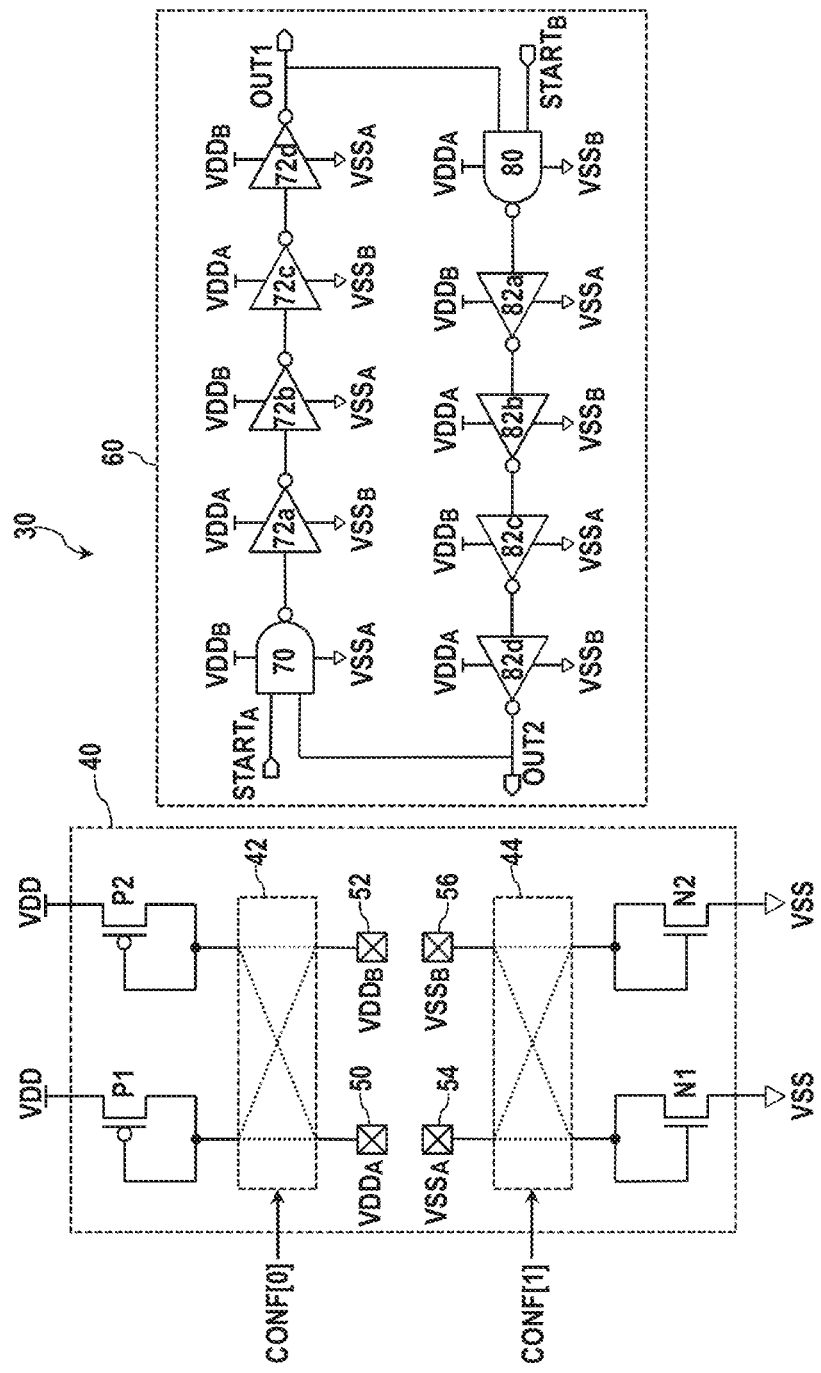
FIG. 4 is a circuit diagram of a hybrid ring oscillator according to an exemplary embodiment of the present disclosure.

FIG. 4 is a circuit diagram of the hybrid ring oscillator 30 according to an exemplary embodiment of the present disclosure.

The hybrid ring oscillator 30 includes a bias voltage generator 40 and a ring oscillator 60. The ring oscillator 60 has a structure in which a plurality of logic gates are connected in a ring shape to generate signals OUT1 and OUT2, which oscillate from a timing when start signals STARTA and STARTB are applied and are stabilized at fixed levels after a predetermined time has elapsed. The fixed levels of the output signals OUT1 and OUT2 depend on unique physical properties of devices in the hybrid ring oscillator 30 and are determined inevitably, not accidentally during the operation. Thus, the fixed levels of the output signals OUT1 and OUT2 are always the same for each PUF cell. The bias voltage generator 40 supplies a bias voltage to the ring oscillator 60 such that the differences in physical properties between the devices due to the local non-uniformity of process conditions are amplified, and assists the ring oscillator 60 to reveal stable operational characteristics with superior repeatability regardless of changes in environmental conditions such as a temperature and bias voltages.

The bias voltage generator 40 may include two PMOS transistors P1 and P2, a first switching circuit 42, two NMOS transistors N1 and N2, and a second switching circuit 44.

The PMOS transistor P1 has a source biased to the positive supply voltage VDD and a gate coupled to its drain to form a diode connection. The drain of the PMOS transistor P1 may be connected to either a first node 50 or a second node 52 through the first switching circuit 42. The PMOS transistor P2 has a source biased to the positive supply voltage VDD and a gate coupled to its drain to form a diode connection. The drain of the PMOS transistor P2 may be connected to either the first node 50 or the second node 52 through the first switching circuit 42.

The first switching circuit 42 may connect the drain of one of the PMOS transistors P1 and P2 to the first node 50 and connect the drain of the other one of the PMOS transistors P1 and P2 to the second node 52. When the drain of the PMOS transistor P1 is connected to the first node 50, the drain of the PMOS transistor P2 is connected to the second node 52. When the drain of the PMOS transistor P1 is connected to the second node 52, the drain of the PMOS transistor P2 is connected to the first node 50.

Since the drain voltages of the PMOS transistors P1 and P2 are determined by threshold voltages of them, the drain voltages of the PMOS transistors P1 and P2 may be different from each other due to process mismatch. Accordingly, a voltage level of the first node 50 may be different from a voltage level of the second node 52. The voltage levels of the first and second nodes 50 and 52 are supplied to the ring oscillator 60 as first and second positive supply voltages $VDD_A$ and $VDD_B$, respectively.

The NMOS transistor N1 has a source biased to the negative supply voltage VSS and a gate coupled to its drain to form a diode connection. The drain of the NMOS transistor N1 may be connected to either a third node 54 or a fourth node 56 through the second switching circuit 44. The NMOS transistor N2 has a source biased to the negative supply voltage VSS and a gate coupled to its drain to form a diode connection. The drain of the NMOS transistor N2 may be connected to either the third node 54 or the fourth node 56 through the second switching circuit 44.

The second switching circuit 44 may connect the drain of one of the NMOS transistors N1 and N2 to the third node 54 and connect the drain of the other one of the NMOS transistors N1 and N2 to the fourth node 56. When the drain of the NMOS transistor N1 is connected to the third node 54, the drain of the NMOS transistor N2 is connected to the fourth node 56. When the drain of the NMOS transistor N1 is connected to the fourth node 56, the drain of the NMOS transistor N2 is connected to the third node 54.

Since the drain voltages of the NMOS transistors N1 and N2 are determined by threshold voltages of them, the drain voltages of the NMOS transistors N1 and N2 may be different from each other due to the process mismatch. Accordingly, a voltage level of the third node 54 may be different from a voltage level of the fourth node 56. The voltage levels of the third and fourth nodes 54 and 56 are supplied to the ring oscillator 60 as first and second negative supply voltages $VSS_A$ and $VSS_B$, respectively.

Figure 5:
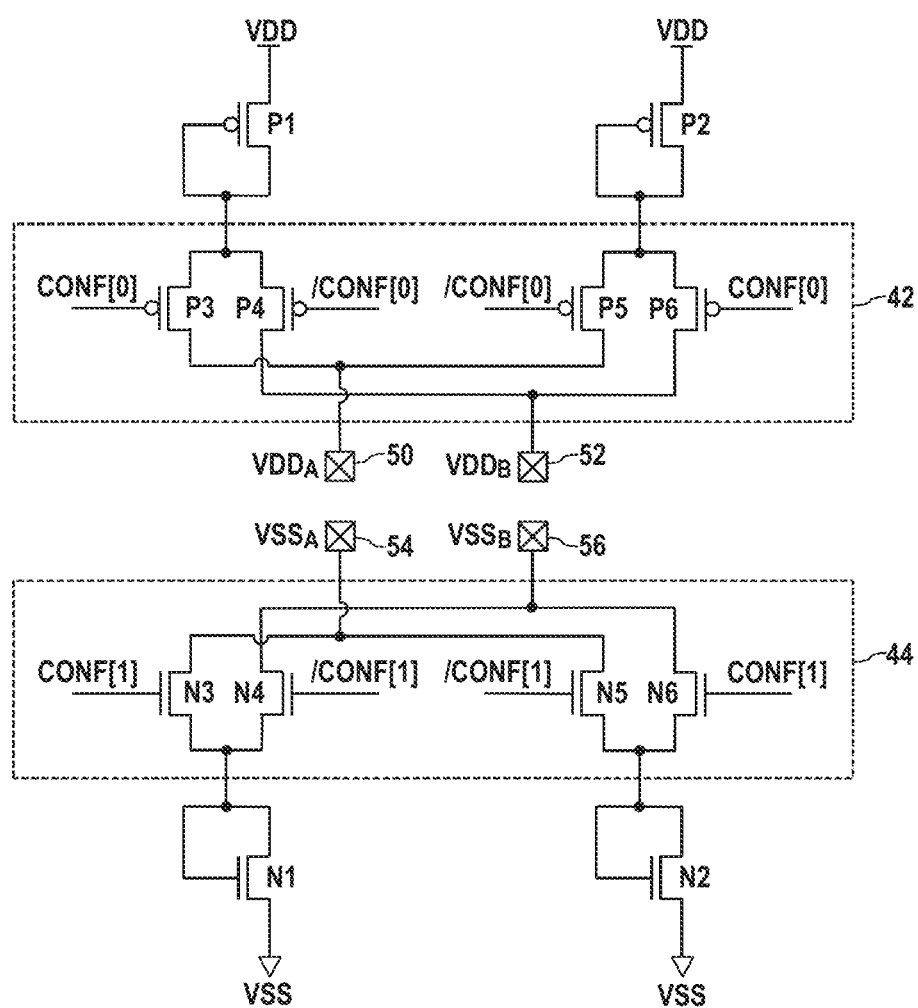
FIG. 5 is a detailed circuit diagram of a bias voltage generator shown in FIG. 4.

FIG. 5 is a detailed circuit diagram of the bias voltage generator 40.

Referring to FIG. 5, the first switching circuit 42 receives a cell configuration signal CONFIG[0] and an inverted cell configuration signal /CONFIG[0] to connect one of the drains of the POS transistors P1 and P2 to the first node 50 and the other one of the drains of the POS transistors P1 and P2 to the second node 52 according to the signals. The first switching circuit 42 may include four PMOS transistors P3-P6. The PMOS transistor P3 has a source connected to the drain of the PMOS transistor P1, a drain connected to the first node 50, and a gate receiving the cell configuration signal CONFIG[0]. The PMOS transistor P4 has a source connected to the drain of the PMOS transistor P1, a drain connected to the second node 52, and a gate receiving the inverted cell configuration signal /CONFIG[0]. The PMOS transistor P5 has a source connected to the drain of the PMOS transistor P2, a drain connected to the first node 50, and a gate receiving the inverted cell configuration signal /CONFIG[0]. The PMOS transistor P6 has a source connected to the drain of the PMOS transistor P2, a drain connected to the second node 52, and a gate receiving the cell configuration signal CONFIG[0].

When the cell configuration signal CONFIG[0] is 'high' and the inverted cell configuration signal /CONFIG[0] is 'low', the PMOS transistors P3 and P6 are turned off and the PMOS transistors P4 and P5 are turned on. Accordingly, the drain of the PMOS transistor P2 is connected to the first node 50 and the drain of the PMOS transistor P1 is connected to the second node 52 in this case. On the other hand, when the cell configuration signal CONFIG[0] is 'low' and the inverted cell configuration signal /CONFIG[0] is 'high', the PMOS transistors P3 and P6 are turned on and the PMOS transistors P4 and P5 are turned off. Accordingly, the drain of the PMOS transistor P1 is connected to the first node 50 and the drain of the PMOS transistor P2 is connected to the second node 52 in this case.

If manufactured under an ideal process condition, the PMOS transistors P1 and P2 would have the same physical properties, and the voltage $VDD_A$ at the first node 50 would be the same as the voltage $VDD_B$ at the second node 52. However, the local variation of process conditions makes the actual physical properties of the PMOS transistors P1 and P2 be different from each other and the voltage $VDD_A$ at the first node 50 is different from the voltage $VDD_B$ at the second node 52.

The second switching circuit 44 receives a cell configuration signal CONFIG[1] and an inverted cell configuration signal CONFIG[1] to connect one of the drains of the NMOS transistors N1 and N2 to the third node 54 and the other one of the drains of the NMOS transistors N1 and N2 to the fourth node 56 according to the signals. The second switching circuit 44 may include four NMOS transistors N3-N6. The NMOS transistor N3 has a source connected to the drain of the NMOS transistor N1, a drain is connected to the third node 54, and a gate receiving the cell configuration signal CONFIG[1]. The NMOS transistor N4 has a source connected to the drain of the NMOS transistor N1, a drain connected to the fourth node 56, and a gate receiving the inverted cell configuration signal/CONFIG[1]. The NMOS transistor N5 has a source connected to the drain of the NMOS transistor N2, a drain connected to the third node 54, and a gate receiving the inverted cell configuration signal/CONFIG[1]. The NMOS transistor N6 has a source connected to the drain of the NMOS transistor N2, a drain connected to the fourth node 56, and a gate receiving the cell configuration signal CONFIG[1].

When the cell configuration signal CONFIG[1] is 'high' and the inverted cell configuration signal/CONFIG[1] is 'low', the NMOS transistors N3 and N6 are turned on and the NMOS transistors N4 and N5 are turned off. Accordingly, the drain of the NMOS transistor N1 is connected to the third node 54 and the drain of the NMOS transistor N2 is connected to the fourth node 56 in this case. On the other hand, when the cell configuration signal CONFIG[1] is 'low' and the inverted cell configuration signal/CONFIG[1] is 'high', the NMOS transistors N3 and N6 are turned off and the NMOS transistors N4 and N5 are turned on. Accordingly, the drain of the NMOS transistor N1 is connected to the fourth node 54 and the drain of the NMOS transistor N2 is connected to the third node 54 in this case.

If manufactured under an ideal process condition, the NMOS transistors N1 and N2 would have the same physical properties, and the voltage $VSS_A$ at the third node 54 would be the same as the voltage $VSS_B$ at the fourth node 56. However, the local variation of process conditions makes the actual physical properties of the NMOS transistors N1 and N2 be different from each other and the voltage $VSS_A$ at the third node 54 is different from the voltage $VSS_B$ at the fourth node 56.

The voltage $VDD_A$ at the first node 50 and the voltage $VDD_B$ at the second node 52 may be supplied to the ring oscillator 60 through respective rails (not shown) provided separately. Also, the voltage $VSS_A$ at the third node 54 and the voltage $VSS_B$ at the fourth node 56 may be supplied to the ring oscillator 60 through respective rails. As a result, the bias voltage generator 40 supplies the first and second positive supply voltages $VDD_A$ and $VDD_B$ to the ring oscillator 60 through two positive supply voltage rails, and supplies the first and second negative supply voltages $VSS_A$ and $VSS_B$ to the ring oscillator 60 through two negative supply voltage rails.

Referring back to FIG. 4, the ring oscillator 60 according to an exemplary embodiment of the present disclosure has a structure in which two general ring oscillators are combined to form a loop. In detail, the ring oscillator 60 includes a first oscillator or a first oscillation path and a second oscillator or a second oscillation path coupled to the first oscillator to form a loop. The first oscillator may include a NAND gate 70 and a plurality of inverters 72a-72d. The second oscillator may include a NAND gate 80 and a plurality of inverters 82a-82d. The number of inverters 72a-72d is equal to the number of inverters 82a-82d and is even.

The NAND gate 70 may receive a start signal STARTA through one input terminal and receive a second output signal OUT2 from an eighth inverter 82D through the other input terminal. An output terminal of the NAND gate 70 may be coupled to an input terminal of the first inverter 72A. The first through fourth inverters 72A-72D are connected in series. The output of the fourth inverter 72D may be a first output signal OUT1 of the ring oscillator 60. Meanwhile, the NAND gate 80 may receive a start signal STARTB through one input terminal and receive the first output signal OUT1 from the fourth inverter 72D through the other input terminal. An output terminal of the NAND gate 80 may be coupled to an input terminal of a fifth inverter 82A. The fifth through eighth inverters 82A-82D are connected in series. The output of the eighth inverter 82D may be the second output signal OUT2 of the ring oscillator 60. Here, the two start signals STARTA and STARTB may actually be the same as each other. In other words, the start signal STARTA may be used as the start signal STARTB also.

Among the NAND gates 70 and 80 and the first through eighth inverters 72A-72D and 82A-82D, the logic gates adjacent to each other receive supply voltages from different supply voltage rails. For example, the NAND gate 70, the second inverter 72B, the fourth inverter 72D, the fifth inverter 82A, and the seventh inverter 82C may be biased to the second positive supply voltage $VDD_B$ and the first negative supply voltage $VSS_A$. Also, the first inverter 72A, the third inverter 72C, the NAND gate 80, the sixth inverter 82B, and the eighth inverter 82D may be biased to the first positive supply voltage $VDD_A$ and the second negative supply voltage $VSS_B$. That is, each logic gate receives the positive supply voltage and the negative supply voltage from supply voltage rails different from those of adjacent logic gates.

In the ring oscillator 60, the first and second output signals OUT1 and OUT2 may have substantially the same level as each other just after the start signals STARTA and STARTB are applied. Due to the difference in physical properties of the devices in the ring oscillator 60, however, one of the first and second output signals OUT1 and OUT2 catches up with the other one after a certain time has elapsed, and the oscillating operation collapses. As a result, the first and second output signals OUT1 and OUT2 are latched and fixed at levels complementary to each other. Two positive supply voltages $VDD_A$ and $VDD_B$ and two negative supply voltages $VSS_A$ and $VSS_B$ supplied to the ring oscillator 60 through separate rails may shorten the time required for the collapse and enable the ring oscillator 60 to operate stably regardless of the changes in the environmental condition such as the temperature.

The operation of the ring oscillator 60 will be described in more detail with reference to FIGS. 6-8.

Figure 6:
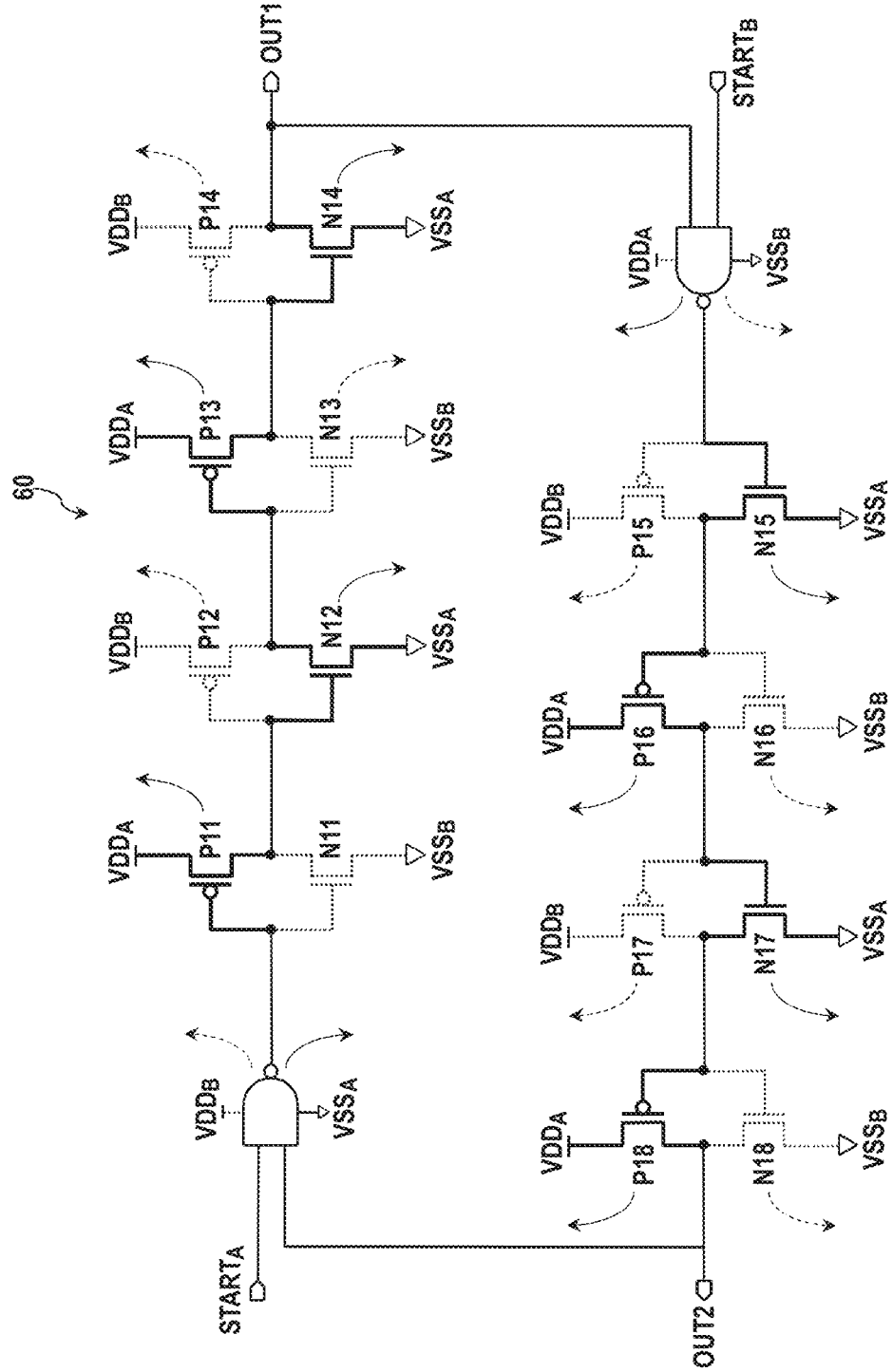
FIG. 6 is a detailed circuit diagram of a ring oscillator for assisting an understanding of the operation thereof.

FIG. 6 is a detailed circuit diagram of the ring oscillator 60 for assisting an understanding of the operation thereof. Referring to FIG. 6, each of the first through eighth inverters 72A-72D and 82A-82D may be implemented by a transistor pair including one PMOS transistor and one NMOS transistor. Each transistor pair may be implemented by a CMOS transistor.

The first positive supply voltage $VDD_A$ is supplied to a source of a PMOS transistor P11 of the first inverter 72A, a source of a PMOS transistor P13 of the third inverter 72C, a first power terminal of the second NAND gate 80, a source of a PMOS transistor P16 of the sixth inverter 82B, and a source of a PMOS transistor P18 of the eighth inverter 82D. The second positive supply voltage $VDD_B$ is supplied to a first power terminal of the first NAND gate 70, a source of a PMOS transistor P12 of the second inverter 72B, a source of a PMOS transistor P14 of the fourth inverter 72D, a source of a PMOS transistor P15 of the fifth inverter 82A, and a source of a PMOS transistor P17 of the seventh inverter 82C. Thus, the first and second positive supply voltages $VDD_A$ and $VDD_B$ are alternately supplied to the first power terminal of the first NAND gate 70, the sources of the PMOS transistors P11-P14, the first power terminal of the second NAND gate 80, and the sources of the PMOS transistors P15-P18.

The first negative supply voltage $VSS_A$ is supplied to a second power terminal of the first NAND gate 70, a source of a NMOS transistor N12 of the second inverter 72B, a source of a NMOS transistor N14 of the fourth inverter 72D, a source of a NMOS transistor N15 of the fifth inverter 82A, and a source of a NMOS transistor N17 of the seventh inverter 82C. The second negative supply voltage $VSS_B$ is supplied to a source of a NMOS transistor N11 of the first inverter 72A, a source of a NMOS transistor N13 of the third inverter 72C, a second power terminal of the second NAND gate 80, a source of a NMOS transistor N16 of the sixth inverter 82B, and a source of a NMOS transistor N18 of the eighth inverter 82D. Thus, the first and second negative supply voltages VSS$_A$ and VSS$_B$ are alternately supplied to the second power terminal of the first NAND gate 70, the sources of the NMOS transistors N11-N14, the second power terminal of the second NAND gate 80, and the sources of the NMOS transistors N15-N18.

In FIG. 6, the ring oscillator 60 may oscillate signals OUT1 and OUT2 through a first delay path composed of transistors indicated by dotted lines and a second delay path composed of transistors indicated by solid lines.

Timings of the rising edges of the first output signal OUT1 and the falling edges of the second output signal OUT2 may be determined by the pull-up operation of a pull-up transistor (not shown) in the first NAND gate 70, the pull-down operation of the NMOS transistor N11, the pull-up operation of the PMOS transistor P12, the pull-down operation of the NMOS transistor N13, the pull-up transistor of the PMOS transistor P14, the pull-down operation of a pull-down transistor (not shown) in the second NAND gate 80, the pull-up operation of the PMOS transistor P15, the pull-down operation of the NMOS transistor N16, the pull-up operation of the PMOS transistor P17, and the pull-down operation of the NMOS transistor N18.

Timings of the falling edges of the first output signal OUT1 and the rising edges of the second output signal OUT2 may be determined by the pull-down operation of a pull-down transistor (not shown) in the first NAND gate 70, the pull-up operation of the PMOS transistor P11, the pull-down operation of the NMOS transistor N12, the pull-up operation of the PMOS transistor P13, the pull-down operation of the NMOS transistor N14, the pull-up operation of a pull-up transistor (not shown) in the second NAND gate 80, the pull-down operation of the NMOS transistor N15, the pull-up operation of the PMOS transistor P16, the pull-down operation of the NMOS transistor N17, and the pull-up operation of the PMOS transistor P18.

Depending on relative lengths of total delays caused in the pull-up and pull-down operations in the two delay paths, one of two output signals OUT1 and OUT2 is caught by the other and the output value of the PUF cell is determined, which is described in detail.

Figure 7:
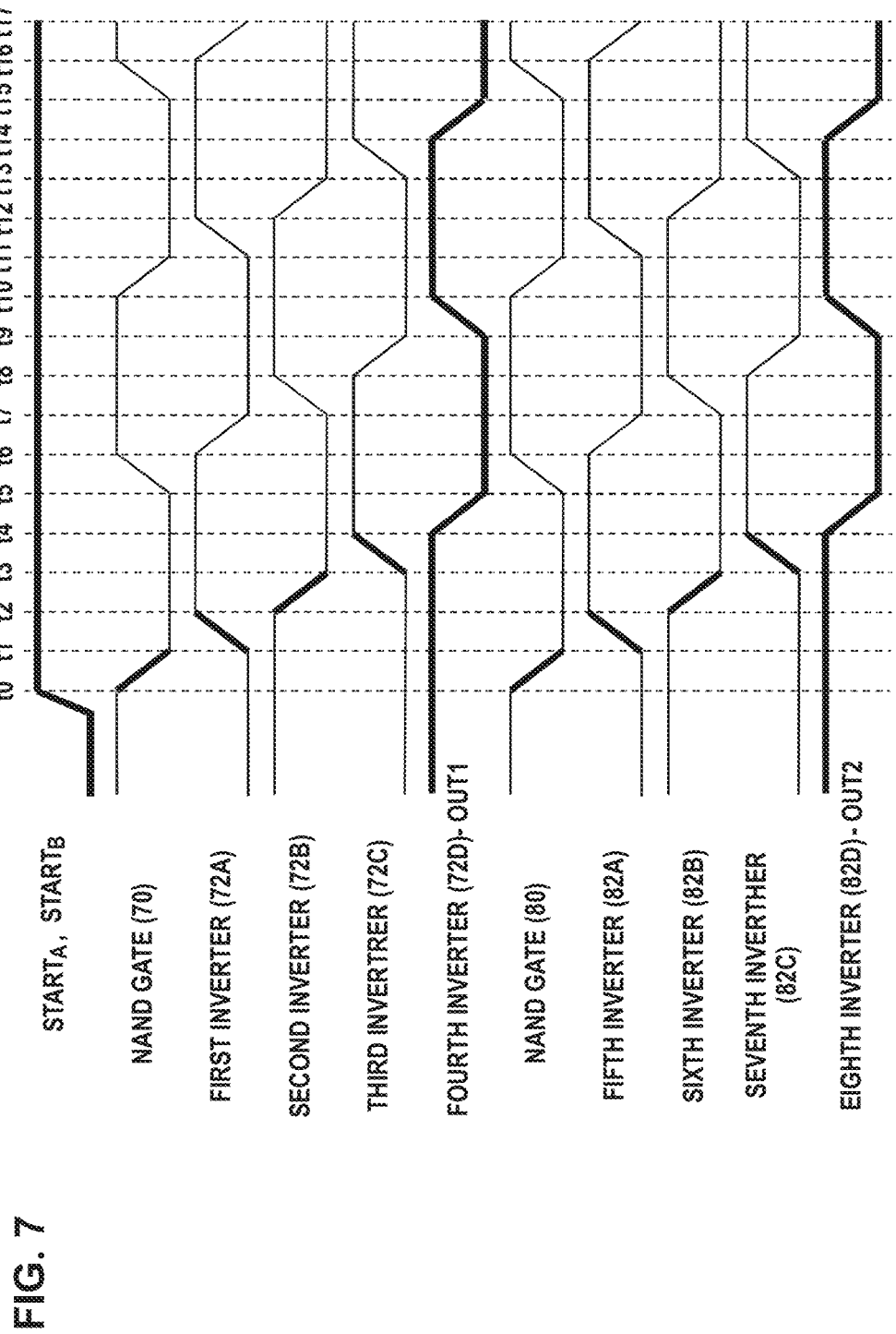
FIG. 7 illustrates exemplary waveform diagrams of outputs of gates in the ring oscillator when physical properties of semiconductor devices constituting the gates in the ring oscillator are assumed to be identical to one another.

FIG. 7 illustrates exemplary waveform diagrams of the outputs of the gates when the physical properties of the semiconductor devices constituting the gates are assumed to be identical to one another. In the operation shown in FIG. 7, it is assumed that a common start signal START is used for the two start signals STARTA and STARTB. When the start signal START is 'low', the first and second output signals OUT1 and OUT2 are at the 'high' levels. In this state, the oscillation operation starts when the start signal START is activated to the 'high' level.

When the start signal START transitions to 'high', the NAND gate 70 outputs 'low' after a delay time. Accordingly, the first through fourth inverters 72A-72D connected in series sequentially output 'high', 'low', 'high', and 'low'. At this time, each of the NAND gate 70 and the first through fourth inverters 72A-72D may output a respective transition signal when a respective delay has elapsed after the reception of its input signal. As a result, the first output signal OUT1 which is the output of the fourth inverter 72D may be transitioned to 'low' at a timing t5 after a certain delay time after the start signal START is activated to 'high' at a timing t0.

Similarly, when the start signal START transitions to 'high' at the timing t0, the NAND gate 80 outputs 'low' after a delay time. Accordingly, the fifth through eighth inverters 82A-82D connected in series sequentially output 'high', 'low', 'high', and 'low'. At this time, the NAND gate 80 and the fifth through eighth inverters 82A-82D may output a respective transition signal when a respective delay has elapsed after the reception of its input signal. As a result, the second output signal OUT2 which is the output of the eighth inverter 82D may be transitioned to 'low' at the timing t5 after a certain delay time after the start signal START is activated to 'high' at the timing t0.

Subsequently, the second output signal OUT2 from the eighth inverter 82D is input to the NAND gate 70, so that the output of the NAND gate 70 may be transitioned. Also, the first output signal OUT1 from the fourth inverter 72D is input to the NAND gate 80, so that the output of the NAND gate 80 may be transitioned. Then, the outputs of the first through fourth inverters 72A-72D and the fifth through eighth inverters 82A-82D may be transitioned sequentially, and states of the first output signal OUT1 and the second output signal OUT2 may be changed to 'high' at a timing t10.

Figure 8A:
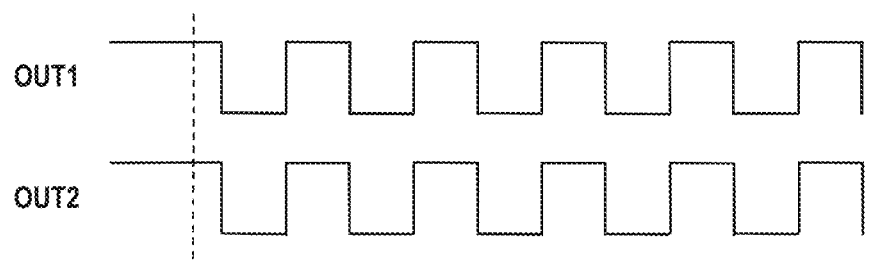
FIG. 8A illustrates exemplary waveforms of the output signals of the ring oscillator when the physical properties of the semiconductor devices constituting the gates in the ring oscillator are assumed to be identical to one another.

As the above process is repeated, the first output signal OUT1 and the second output signal OUT2 may oscillate by transitioning their levels between the 'high' level and the 'low' level at a period which is the same as a sum of internal delays in the gates on each of the delay paths. FIG. 8A illustrate exemplary waveforms of the output signals OUT1 and OUT2 of the ring oscillator 60 when the physical properties of the semiconductor devices constituting the gates are assumed to be identical to one another. In case that the physical properties of the semiconductor devices constituting the gates are identical to one another, the two output signals OUT1 and OUT2 of the ring oscillator 60 may have the same waveform as each other.

However, due to a slight local non-uniformity of process conditions in the manufacturing process, the semiconductor devices show differences in the physical properties, and the delays in the gates in the ring oscillator 60 happen to be different from one another. As a result, the sum of the delays in the first NAND gate 70 and the first through fourth inverters 72A-72D may be different from the sum of the delays in the second NAND gate 80 and the fifth through eighth inverters 82A-82D. Consequently, an edge racing occurs between the first output signal OUT1 and the second output signal OUT2.

If the sum of the delays in the pull-down and pull-up operations of the transistors on the first delay path indicated by the dotted line in FIG. 6 is greater than the sum of the delays in the pull-up and pull-down operations of the transistors on the second delay path indicated by the solid line, the rising edge of the first output signal OUT1 may become faster than (get ahead of) the rising edge of the second output signal OUT2 or the falling edge of the second output signal OUT2 may become slower than the falling edge of the first output signal OUT1.

Figure 8B:
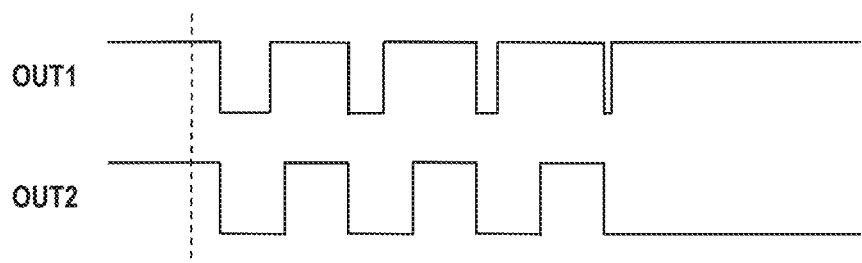
FIG. 8B is a waveform diagram showing a change in the output signals of the ring oscillator when a rising edge of a first output signal is faster than a rising edge of a second output signal.

In case that the rising edge of the first output signal OUT1 is faster (earlier) than the rising edge of the second output signal OUT2 as shown in FIG. 8B, the delay in the first delay path indicated by the dotted line in FIG. 6 is shorter than the delay in the second delay path indicated by the solid line, and the rising edges of the first output signal OUT1 get faster and faster. As a result, there happens a timing when the N-th rising edge of the first output signal OUT1 catches up with a falling edge of the second output signal OUT2 as expressed by Equation 1 or overlaps with the (N−1)-th falling edge of the first output signal OUT1. When such a situation occurs, the oscillating function collapses and the first and second output signals OUT1 and OUT2 latches to 'high' and 'low', respectively, and do not change.

$$T_{OUT1,rise,N}=T_{OUT2,fall,N} \quad \text{[Equation 1]}$$

Figure 8C:
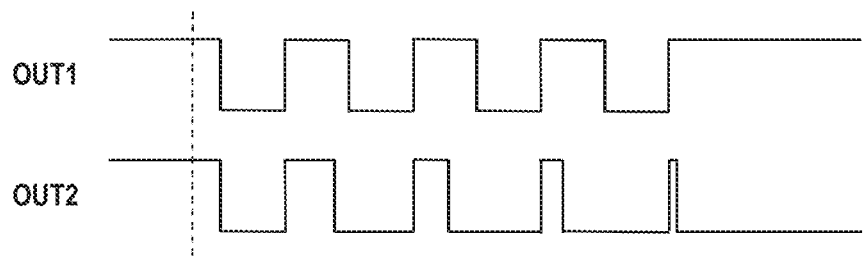
FIG. 8C is a waveform diagram showing a change in the output signals of the ring oscillator when a falling edge of the second output signal is faster than a falling edge of the first output signal.

Also, in case that the falling edge of the second output signal OUT2 is faster (earlier) than the falling edge of the first output signal OUT1 as shown in FIG. 8C, the delay in the first delay path indicated by the dotted line in FIG. 6 is shorter than the delay in the second delay path indicated by the solid line, and the falling edges of the second output signal OUT2 get faster and faster. As a result, there happens a timing when the (N+1)-th falling edge of the second output signal OUT2 catches up with the rising edge of the first output signal OUT1 as expressed by Equation 2. In such a case, the oscillating function collapses also, and the first and second output signals OUT1 and OUT2 latches to 'high' and 'low', respectively, and do not change.

$$T_{OUT2,fall,N+1}=T_{OUT2,rise,N} \quad \text{[Equation 2]}$$

Though the case where the rising edge of the first output signal OUT1 is faster than the rising edge of the second output signal OUT2 and the case where the falling edge of the second output signal OUT2 is faster than the falling edge of the first output signal OUT1 were described with reference to FIGS. 8B and 8C, respectively, the case where the rising edge of the second output signal OUT2 is faster than the rising edge of the first output signal OUT1 or the falling edge of the first output signal OUT1 is faster than falling edge of the second output signal OUT2 may be explained similarly.

As described above, the differences in the physical properties of between the semiconductor devices in the gates and resulting differences in the delays in the gates may collapse the oscillating operation of the ring oscillator 60, so that the ring oscillator 60 no longer oscillates and the first and second output signals OUT1 and OUT2 maintain fixed output levels. The latched logic levels of the output signals OUT1 and OUT2 and the timing at which the logic levels are latched may vary according to the differences in the delays in the delay paths. The output value of the ring oscillator 60 after the ring oscillator 60 may be regarded as one of the characteristics of the corresponding PUF cell 22.

In particular, according to an exemplary embodiment of the present disclosure, the bias voltage of each gate in the ring oscillator 60 may be set to be different from the bias voltages of neighboring gates so as to reduce an instability of the ring oscillator 60 and shorten a time required for an oscillation collapse and a stabilization of the output levels.

An example is provided for the case where the rising edge of the first output signal OUT1 is faster than the rising edge of the second output signal OUT2 as shown in FIG. 8B or the falling edge of the second output signal OUT2 is faster than the falling edge of the first output signal OUT1 as shown in FIG. 8C.

The second positive supply voltage $VDD_B$ may be set to be a level greater than the level of the first positive supply voltage $VDD_A$. In such a case, the PMOS transistors P12, P14, P16, and P18 in the second delay path indicated by the solid line in FIG. 6 are biased at the second positive supply voltage $VDD_B$ having a relatively large level and may be pulled up faster than the PMOS transistors P11, P13, P15, and P17 in the first delay path biased at the first positive supply voltage $VDD_A$. In contrast, the PMOS transistors P11, P13, P15, and P17 in the second delay path indicated by the dotted line may be pulled up slowly. The difference in the pull-up speeds may further increase the difference in rising speeds between the rising edge of the first output signal OUT1 and the rising edge of the second output signal OUT2.

Also, in this example, the second negative supply voltage $VSS_B$ may be set to be a level smaller (i.e. negative but having a larger magnitude) than the first negative supply voltage $VSS_A$. In such a case, the NMOS transistors N11, N13, N15, and N17 in the second delay path indicated by the solid line in FIG. 6 are biased at the second negative supply voltage $VSS_B$ having a relatively large magnitude and may be pulled down faster than the NMOS transistors N12, N14, N16, and N18 in the first delay path biased at the first negative supply voltage $VSS_A$. In contrast, the NMOS transistors N12, N14, N16, and N18 in the second delay path indicated by the dotted line may be pulled down slowly. The difference in the pull-down speeds may further increase the difference in falling speeds between the falling edge of the second output signal OUT2 and the falling edge of the first output signal OUT1.

A combination of the positive supply voltages $VDD_A$ and $VDD_B$ and the negative power voltages $VSS_A$ and $VSS_B$ may further increase the differences in the delays and the transition speeds between the first output signal OUT1 and the second output signal OUT2 during the edge racing. Therefore, it is possible to shorten the time until the oscillating operation collapses in the ring oscillator 60, and to end the edge lacing early to stabilize the signals. In addition, the biasing scheme described above may reduce a possibility of a malfunction of the PUF cell due to environmental factors and increase a repeatability and the stability of the PUF cell.

As mentioned above, the first switching circuit 42 of the bias voltage generator 40 receives the drain potential of the PMOS transistor P1 and the drain potential of the PMOS transistor P2, to supply one of the two potentials to the ring oscillator 60 as the first positive supply voltage $VDD_A$ and the other drain potential to the ring oscillator 60 as the second positive supply voltage $VDD_B$ in response to the cell configuration signals CONFIG[0] and /CONFIG[0]. The second switching circuit 44 receives the drain potential of the NMOS transistor N1 and the drain potential of the NMOS transistor N2 to supply one of the two potentials to the ring oscillator 60 as the first negative supply voltage $VSS_A$ and the other potential to the ring oscillator 60 as the second negative supply voltage $VSS_B$ in response to the cell configuration signals CONFIG[1] and /CONFIG[1]). That is, the cell configuration signals CONFIG[0], /CONFIG[0], CONFIG[1], and /CONFIG[1] allows to determine the first and second positive supply voltages $VDD_A$ and $VDD_B$ and the first and second negative supply voltages $VSS_A$ and $VSS_B$.

According to an exemplary embodiment of the present disclosure, there may be provided a cell configuration information determining unit that determines a cell configuration information, i.e. a combination of the cell configuration signals CONFIG[0:1] and /CONFIG[0:1] suitable for each PUF cell 22. In the exemplary embodiment shown in FIG. 1, the cell configuration information determining unit may be hardware mounted in the controller 90, or software or firmware executable by the controller 90. In the exemplary embodiment, the cell configuration information determining unit may store the cell configuration information in the flash memory 99, so that the cell configuration signal supplier 14 may supply the cell configuration signals to the PUF cell array 20 with reference to the cell configuration information stored in the flash memory 99. Alternatively, however, the cell configuration information determining unit may be included in the cell configuration signal supplier 14. In another embodiment, the cell configuration information may be determined during a manufacturing process of the PUF block 10 and stored in the cell configuration signal supplier 14 or a separate nonvolatile memory cell.

Figure 9:
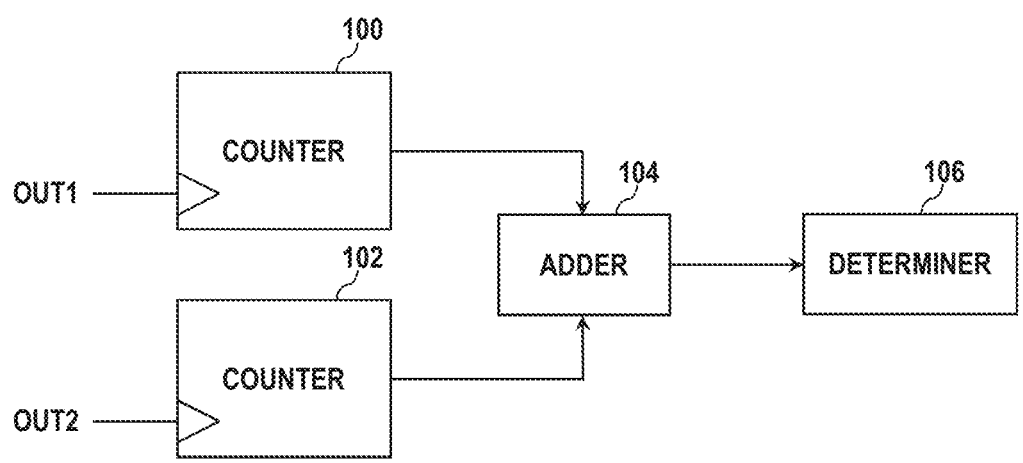
FIG. 9 is a block diagram of a cell configuration information determining unit.
Figure 10:
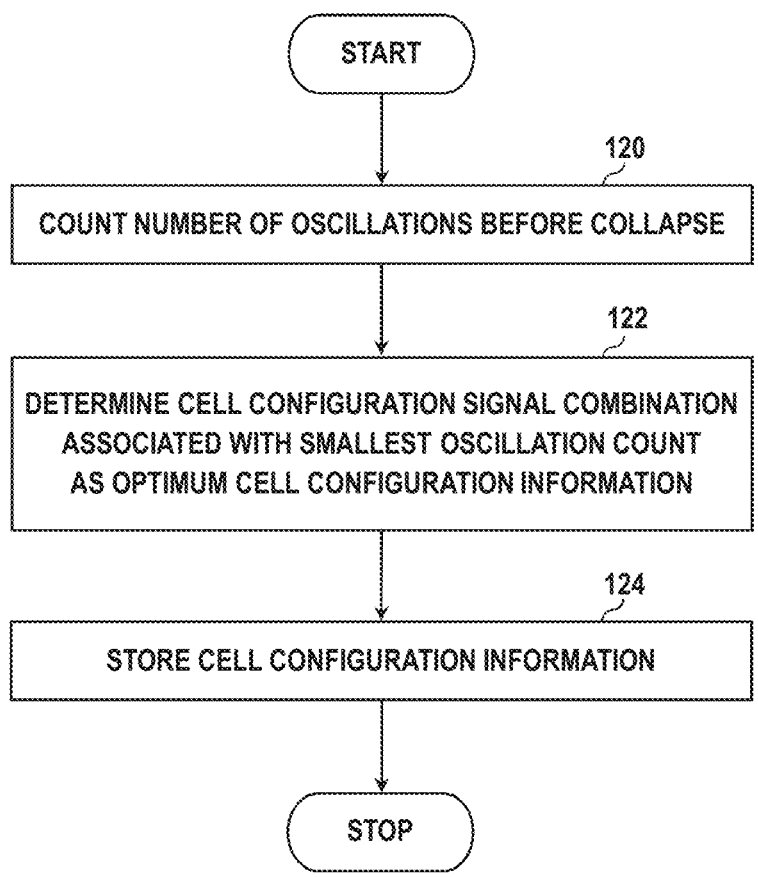
FIG. 10 is a flowchart illustrating a process of generating cell configuration information in the cell configuration information determining unit.

FIG. 9 is a block diagram of the cell configuration information determining unit, and FIG. 10 is a flowchart illustrating a process of generating the cell configuration information in the cell configuration information determining unit.

The cell configuration information determining unit shown in FIG. 9 determines a combination of the bias voltages maximizing the frequency difference between the two oscillation paths in the ring oscillator 60. The cell configuration information determining unit may include a first counter 100, a second counter 102, an adder 104, and a determiner 106. As mentioned above, the larger the frequency difference between the first oscillation path composed of the gates 70-72D and the second oscillation path composed of the gates 80-82D is, the smaller a number of cycles required for one of the oscillation paths catches up with the other oscillation path is. The first and second counters 100 and 102 count numbers of pulses contained in the first and second output signals OUT1 and OUT2, respectively, before the collapse for each combination of the cell configuration signals CONFIG[0:1] and CONFIG[0:1]), i.e. for (0,0), (0,1), (1,0), and (1,1). The adder 104 may add count values COUNT1 and COUNT2 from the first and second counters 100 and 102 to determine a total number of the pulses or oscillations. The determiner 106 may determine the cell configuration signal combination associated with a smallest total number of oscillations before the collapse as an optimal cell configuration information for the PUF cell (step 122). The determiner 106 may store the determined cell configuration information in the flash memory 99 (step 124). After the optimal cell configuration information is set, the output signal value of the PUF circuit may be used as the key value.

Figure 11:
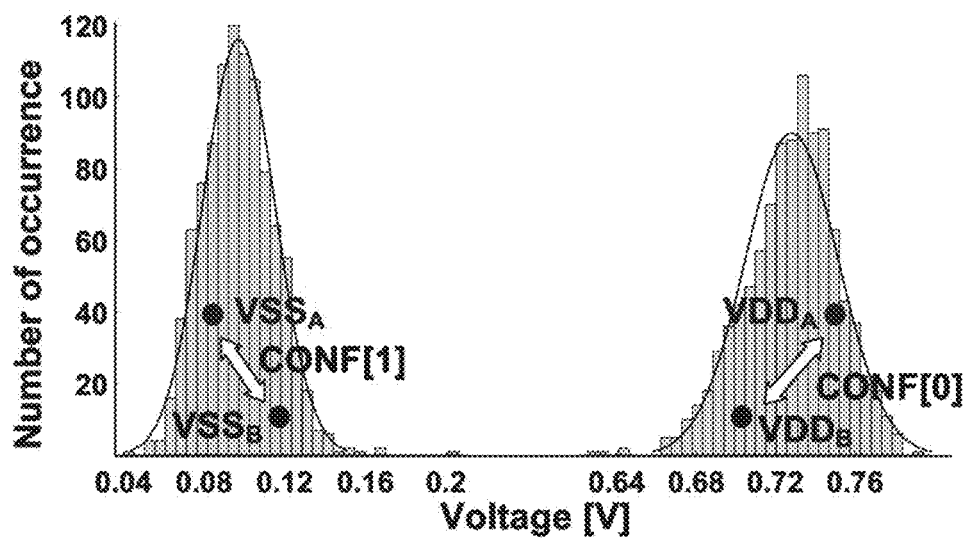
FIG. 11 is a histogram showing a change in bias voltages of the ring oscillator due to an operation of a cell configuration information determining unit.

FIG. 11 is a histogram showing a change in the bias voltages of the ring oscillator due to an operation of the cell configuration information determining unit.

The first and second positive supply voltages $VDD_A$ and $VDD_B$ and the first and second negative supply voltages $VSS_A$ and $VSS_B$ of the PUF cells may have values in certain respective ranges. In the example shown in FIG. 11, the first and second positive supply voltages $VDD_A$ and $VDD_B$ may be in a range of 0.63-0.80 volts (V), and the first and second negative supply voltages $VSS_A$ and $VSS_B$ may be in a range of 0.04-0.21 V. The larger the positive supply voltages $VDD_A$ and $VDD_B$ are and the smaller the negative supply voltages $VSS_A$ and $VSS_B$ are, the smaller the switching delays of the associated gates are. Contrarily, the smaller the positive supply voltages $VDD_A$ and $VDD_B$ are and the larger the negative supply voltages $VSS_A$ and $VSS_B$ are, the larger the switching delays of the associated gates are. According to an exemplary embodiment, the positive supply voltage $VDD_A$ or $VDD_B$ is selected according to the cell configuration signal CONFIG[0] and /CONFIG[0] provided to the first switching circuit 42 of the bias voltage generator 40. In addition, the negative supply voltage $VSS_A$ or $VSS_B$ is selected according to the cell configuration signal CONFIG[1] and /CONFIG[1] provided to the second switching circuit 44 of the bias voltage generator 40.

Figure 12:
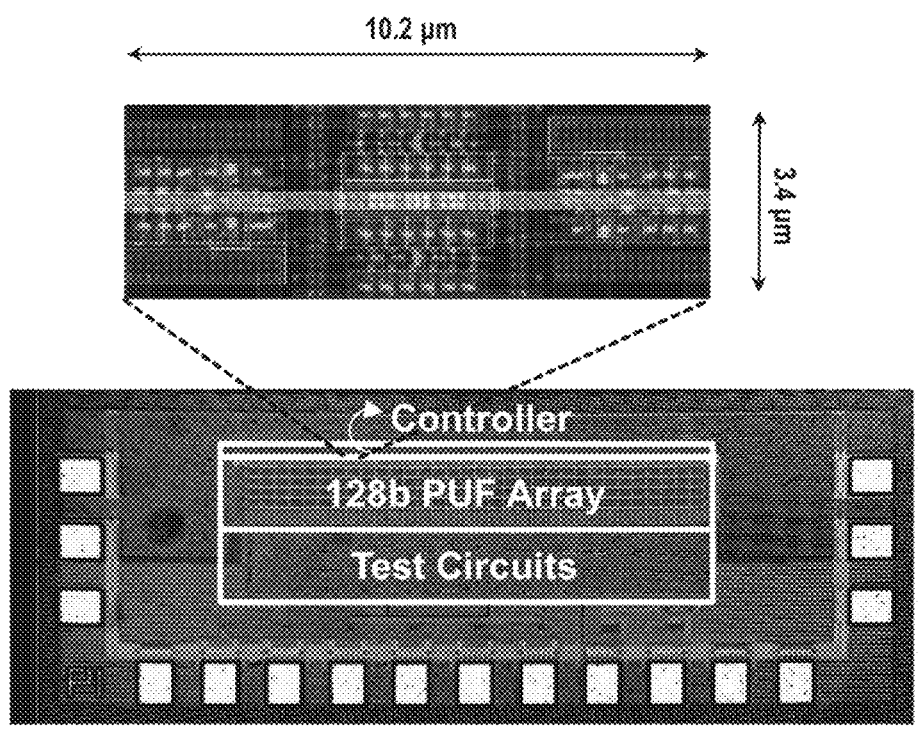
FIG. 12 is a micrograph of a die of an integrated circuit manufactured as an example for implementing the PUF according to the present disclosure.

The inventors implemented an integrated circuit (IC) by a 40 nm CMOS process and evaluated the performance of the IC. FIG. 12 is a micrograph of a die of the IC manufactured as an example for implementing the PUF according to the present disclosure. A lower portion of the drawing is a micrograph of the die, and an upper portion of the drawing is a layout design provided for reference. The manufactured IC includes a test circuit in addition to a PUF cell array including 128 PUF cells arranged in four rows and eight columns and a controller.

Figure 13:
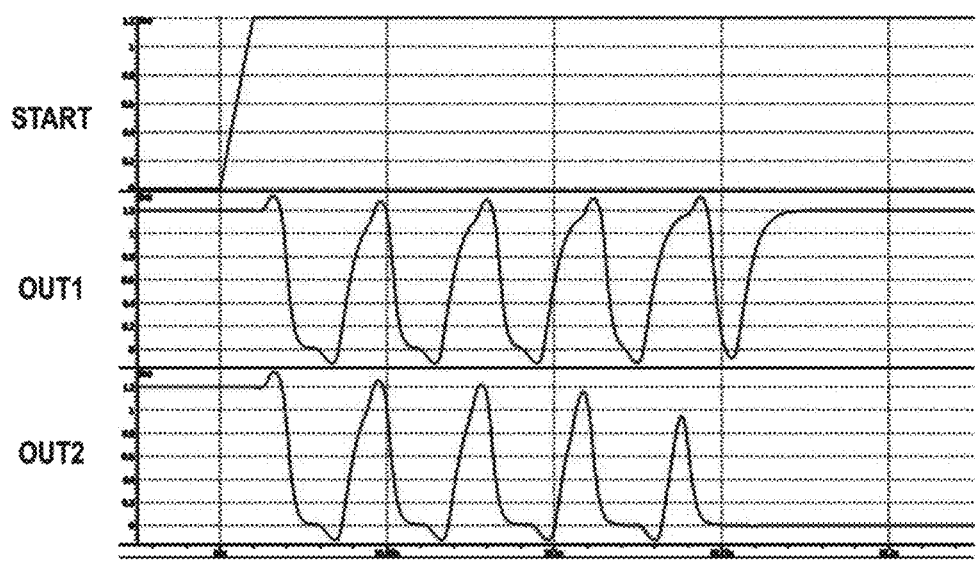
FIG. 13 is a waveform diagram measured actually for the example of the integrated chip shown in FIG. 12.

FIG. 13 is a waveform diagram measured actually for the example of the IC shown in FIG. 12. It was found that, after an application of the start signal START, the second output signal OUT2 collapses in 4.5 oscillation periods, and the first and second output signals OUT1 and OUT2 are stabilized to 'high' and 'low' levels, respectively. FIG. 14 is a table summarizing the performance of the PUF device according to the present disclosure compared with those of existing devices. It can be seen that the overall performance of the PUF device according to the present disclosure is excellent compared with those of recently proposed devices. In particular, the bit error rate (BER) is only 0.027%.

While the present disclosure has been particularly shown and described with reference to exemplary embodiments thereof, it is to be understood that the present disclosure is not limited to the disclosed embodiments, but may be modified in various manners or embodied in different implementations.

For example, the integrated circuit chip having the PUF cells of the present disclosure may include an error detection or error correction circuit for preventing, detecting, or correcting errors to facilitate a stable operation of the semiconductor device while being used for the key generation.

Even though not described in detail above, the semiconductor device including the PUF cells according to the present disclosure may further include redundant cells for the masking for reducing a probability of errors, and an error control coding circuit for detecting or correcting errors.

Although exemplary embodiments were described above in terms of the CMOS, an NMOS or PMOS circuit may be used as well instead of the CMOS.

Therefore, it should be understood that the above-described embodiments are illustrative in all aspects and not restrictive. Thus, it will be understood by those of ordinary skill in the art that various changes in form and details may be made therein without departing from the spirit and scope as defined by the following claims.

What is claimed is:

1. A semiconductor device, comprising:
   a physically unclonable function (PUF) circuit having a plurality of PUF cells, each configured to generate a unique output value,
   wherein each of the plurality of PUF cells comprises:
   a bias voltage generator configured to generate first and second supply voltages of different levels; and
   an oscillator comprising a plurality of inverters connected in series and configured to be alternately biased at the first and second supply voltages.

2. The semiconductor device of claim 1, further comprising:
   a cell configuration signal supplier configured to supply a cell configuration signal to the plurality of PUF cells,
   wherein the bias voltage generator generates the first and second supply voltages according to on the cell configuration signal.

3. The semiconductor device of claim 2, wherein the bias voltage generator generates the first and second voltages of different levels due to a difference in threshold voltages of transistors in the bias voltage generator, and outputs one of the first and second voltages as the first supply voltage and outputs the other one of the first and second voltages as the second supply voltage based on the cell configuration signal.

4. The semiconductor device of claim 2, wherein the oscillator comprises two oscillation paths, each passing through a predetermined number of inverters connected in series to form a loop and alternately biased at the first and second supply voltages.

5. The semiconductor device of claim 4, wherein each of the oscillation paths comprises:
an enable gate configured to activate an oscillating operation of the oscillation path in response to a predetermined start signal; and
the predetermined number of inverters connected in series from an output terminal of the enable gate.

6. The semiconductor device of claim 5, wherein the enable gate has a first input terminal receiving the start signal and a second input terminal receiving an output of the other oscillation path.

7. The semiconductor device of claim 6, wherein the start signals input to the enable gates of the two oscillation paths are identical to each other.

8. The semiconductor device of claim 4, further comprising:
a cell configuration information determining unit configured to generate information on the cell configuration signal for each of the plurality of PUF cells.

9. The semiconductor device of claim 8, further comprising:
a first counter configured to count a number of oscillation cycles in a first oscillation path of the two oscillation paths in one of the PUF cells for a predetermined time;
a second counter configured to count a number of oscillation cycles in a second oscillation path of the two oscillation paths in the PUF cell for the predetermined time; and
a determiner configured to determine the information on the cell configuration signal for the PUF cell based on count values of the first counter and the second counter.

10. The semiconductor device of claim 9, wherein the first counter and the second counter count respective number of oscillation cycles until an oscillating operation of the first oscillation path or the second oscillation path collapses.

11. The semiconductor device of claim 4, wherein each of the plurality of PUF cells outputs an output signal of one of the two oscillation paths as the output value after an output signal of the other one of the two oscillation paths collapses.

12. The semiconductor device of claim 2, wherein the first supply voltage includes a first positive supply voltage and a first negative supply voltage, and the second supply voltage includes a second positive supply voltage and a second negative supply voltage,
wherein the first and second positive supply voltages have levels different from each other, and the first and second negative supply voltages have levels different from each other,
wherein the first and second positive supply voltages alternately bias the plurality of inverters and the first and second negative supply voltages alternately bias the plurality of inverters, such that inverters biased at the first positive supply voltage are biased at the second negative supply voltage and another inverters biased at the second positive supply voltage are biased at the first negative supply voltage.

13. The semiconductor device of claim 12, wherein the bias voltage generator comprises:
a first switching circuit configured to output one of first and second positive voltages having different levels as the first positive supply voltage and output the other one of the first and second positive voltages as the second positive supply voltage in response to the cell configuration signal; and
a second switching circuit configured to output one of first and second negative voltages having different levels as the first negative supply voltage and output the other one of the first and second negative voltages as the second negative supply voltage in response to the cell configuration signal.

14. A semiconductor device, comprising:
a physically unclonable function (PUF) cell array comprising multiple PUF cells; and
a cell selection signal supplier configured to supply a cell selection signal for enabling to select at least one of the multiple PUF cells required to generate an output value,
wherein each of the multiple PUF cells comprises:
an oscillator comprising two oscillation circuits each having a plurality of stages and configured to generate oscillation signals of different frequencies; and
a bias voltage generator configured to generate a plurality of bias voltages supplied to the plurality of stages alternately to increase a frequency difference between the oscillation signals.

15. The semiconductor device of claim 14, further comprising:
a cell configuration signal supplier configured to supply a cell configuration signal to the multiple PUF cells,
wherein the bias voltage generator generates the plurality of bias voltages according to on the cell configuration signal.

16. A security key generation device, comprising:
a PUF cell array comprising multiple PUF cells;
a cell configuration signal supplier configured to supply a cell configuration signal to the multiple PUF cells; and
a cell selection signal supplier configured to supply a cell selection signal for enabling to select a plurality of PUF cells required to generate respective output values among the multiple PUF cells,
wherein each of the multiple PUF cells comprises:
an oscillator comprising two oscillation circuits each having a plurality of stages to generate oscillation signals of different frequencies due to a difference in physical properties of individual devices and output one-bit output value after an oscillations are collapsed; and
a bias voltage generator configured to generate a plurality of bias voltages supplied to the plurality of stages alternately to increase a frequency difference between the oscillation signals,
wherein the security key generation device outputs a combination of the output values from the plurality of PUF cells as a security key.

* * * * *